(12) United States Patent
Ghyselen (10) Patent No.: US 10,644,340 B2
(45) Date of Patent: May 5, 2020

(54) ADVANCED SOLID ELECTROLYTE AND METHOD OF FABRICATION

(71) Applicant: Soitec, Bernin (FR)

(72) Inventor: Bruno Ghyselen, Seyssinet (FR)

(73) Assignee: Soitec, Bernin (FR)

( * ) Notice: Subject to any disclaimer, the term of this patent is extended or adjusted under 35 U.S.C. 154(b) by 882 days.

(21) Appl. No.: 15/088,432

(22) Filed: Apr. 1, 2016

(65) Prior Publication Data

US 2016/0293989 A1 Oct. 6, 2016

(30) Foreign Application Priority Data

Apr. 2, 2015 (FR) .................................. 15 00671

(51) Int. Cl.
| | |
|---|---|
| *H01M 8/1253* | (2016.01) |
| *H01M 4/04* | (2006.01) |
| *H01M 4/88* | (2006.01) |
| *H01M 8/124* | (2016.01) |
| *H01M 10/0562* | (2010.01) |
| *H01M 8/1018* | (2016.01) |
| *G01N 27/40* | (2006.01) |
| *G01N 27/407* | (2006.01) |

(52) U.S. Cl.
CPC ...... *H01M 8/1253* (2013.01); *G01N 27/4073* (2013.01); *H01M 4/04* (2013.01); *H01M 4/88* (2013.01); *H01M 8/124* (2013.01); *H01M 10/0562* (2013.01); *H01M 2008/1095* (2013.01); *H01M 2008/1293* (2013.01); *H01M 2300/0068* (2013.01); *H01M 2300/0074* (2013.01); *H01M 2300/0077* (2013.01); *H01M 2300/0082* (2013.01); *Y02E 60/366* (2013.01); *Y02P 70/56* (2015.11)

(58) Field of Classification Search
CPC .................................................. H01M 8/1253
See application file for complete search history.

(56) References Cited

U.S. PATENT DOCUMENTS

| | | | |
|---|---|---|---|
| 5,234,722 A | 8/1993 | Ito et al. | |
| 6,391,799 B1 * | 5/2002 | Di Cioccio | ......... H01L 21/0475 257/E21.06 |
| 2005/0095497 A1 * | 5/2005 | Yamada | ............. H01M 4/8621 429/483 |

(Continued)

FOREIGN PATENT DOCUMENTS

| | | |
|---|---|---|
| CN | 104067432 B | 9/2016 |
| CN | 104412440 B | 10/2016 |

(Continued)

OTHER PUBLICATIONS

Definition of monocrystalline (Year: 2019).*

(Continued)

*Primary Examiner* — Brian R OHara
(74) *Attorney, Agent, or Firm* — TraskBritt (57) ABSTRACT

A method of providing a layer of solid electrolyte comprises providing a host substrate including a crystalline solid electrolyte layer, and transferring the crystalline solid electrolyte layer from the host substrate to a receiver substrate. The method may be used to manufacture various devices, such as solid oxide fuel cells, oxygen sensors, batteries, and donor structures.

30 Claims, 4 Drawing Sheets

(56) References Cited

U.S. PATENT DOCUMENTS

| | | | |
|---|---|---|---|
| 2011/0049745 A1* | 3/2011 | Katayama | H01M 10/0562 264/104 |
| 2011/0269301 A1 | 11/2011 | Kato et al. | |
| 2011/0310530 A1* | 12/2011 | Laor | H01M 4/0428 29/592.1 |
| 2014/0170505 A1* | 6/2014 | Tsujimura | H01M 10/052 429/322 |
| 2014/0325832 A1* | 11/2014 | Martin | H01M 10/0562 29/623.5 |
| 2014/0374886 A1* | 12/2014 | Kononchuk | H01L 21/187 257/632 |
| 2015/0147659 A1* | 5/2015 | Kato | H01M 10/0562 429/304 |

FOREIGN PATENT DOCUMENTS

| | | |
|---|---|---|
| EP | 2800101 A1 | 11/2014 |
| EP | 2894705 A1 | 7/2015 |
| FR | 2774214 A1 | 7/1999 |
| JP | 03-140859 A | 6/1991 |
| JP | 04-115469 A | 4/1992 |
| JP | 10-321548 A | 12/1998 |
| JP | 11-118758 A | 4/1999 |
| JP | 2013-114966 A | 6/2013 |
| JP | 2014-137869 A | 7/2014 |
| TW | 181405 B | 4/1992 |
| WO | 2010/035197 A1 | 4/2010 |
| WO | 2014111791 A1 | 7/2014 |

OTHER PUBLICATIONS

Coddet et al., A Review on High Power SOFC Electrolyte Layer Manufacturing Using Thermal Spray and Physical Vapour Deposition Technologies, Advanced Manufacturing, vol. 2, (2014), pp. 212-221.

French Search Report for French Application No. 1500671 dated Jan. 22, 2016, 8 pages.

Pryds et al., Large-Area Production of Yttria-Stabilized Zirconia by Pulsed Laser Deposition, Journal of Physics: Conference Series 59, (2007), pp. 140-143.

Extended European Search Report for EP Application No. 18189543.4 dated Oct. 19, 2018, 9 pages.

European Office Action for European Application No. 16162797 dated Jan. 24, 2018, 4 pages.

European Search Report and Opinion for European Application No. 16162797 dated Jun. 27, 2016, 6 pages.

Japanese Search Report for Japanese Application No. 2016-062112, dated Feb. 28, 2019, 17 pages with English Translation.

Japanese Notice of Reasons for Refusal for Japanese Application No. 2016-062112, dated Mar. 12, 2019, 9 pages with English Translation.

Japanese Notice of Reasons for Refusal for Japanese Application No. 2016-06211, dated Feb. 4, 2020, 12 pages with English Translation.

Taiwanese Office Action for Taiwanese Application No. 10821126320, dated Oct. 30, 2019, 11 pages.

* cited by examiner

ADVANCED SOLID ELECTROLYTE AND METHOD OF FABRICATION

PRIORITY CLAIM

Pursuant to 35 U.S.C. § 119(a), this application claims the benefit of the filing date of French Patent Application Serial No. 1500671, filed Apr. 2, 2015, for "Advanced Solid Electrolyte and Method of Fabrication," the contents of which are incorporated herein in their entirety by this reference.

TECHNICAL FIELD

The present disclosure generally relates to a fabrication method of a layer of solid electrolyte material which is, in particular, interesting for applications, such as, for instance, electrochemical conversion devices or sensors, in particular a solid oxide fuel cell and oxygen sensors.

BACKGROUND

General concerns about global warming have initiated many studies in order to find alternative solutions with respect to the utilization of fossil fuels, one of which has been the development of the so-called solid oxide fuel cell (SOFC). Industrial scale production of high power fuel cells remains uncertain essentially due to the high production costs and limited life time of these devices. The high production costs are due to time consuming manufacturing techniques while limited life time is linked to the high working temperature of the cells. Such high working temperatures are necessary in order to achieve high ionic conductivity of the materials used as solid electrolyte as the ionic conductivity is a temperature dependent materials parameter. The main actual trends in research are directed to the developments of solid electrolyte layers with higher ionic conductivity and/or lower thickness in order to be able to reduce the working temperature of the cells. However, the thickness of the solid electrolyte layer has to be chosen with respect to the material quality, in particular, in order to avoid electrical shortcuts (for applications for which such a parameter is important) and/or maintain gas tightness, which are limiting factors, both of which in particular for SOFCs. Further, for low thickness the uniformity of the thickness is highly affected due to the polycrystalline morphology of certain materials commonly used as an electrolyte for the SOFC. The grain size represents a lower limit for the thickness below which the materials properties might change and cannot be guaranteed anymore.

A recent review published in Advances in Manufacturing, vol. 2, Issue 3, pp. 212-221, describes recent efforts obtained using thermal spray techniques and physical vapor deposition (PVD) techniques for SOFC electrolyte layer manufacturing.

For what concerns thermal spraying, developments have been made with regards to the spraying parameters as well as post processing of the deposited layers but none of these developments were able to provide solid electrolyte layers with a thickness below 10 µm nor has been able to achieve high ionic conductivity compared to high quality bulk material, such as, for example, for yttria stabilized zirconia (YSZ).

PVD has normally the advantage that thin films with rather high stoichiometric quality can be produced, but in the context of SOFC the application of PVD is difficult due to the high porosity of the electrode materials acting as growth substrates, which is prerequisite of such cells. This impact on material quality influences the already rather low mechanical stability of such PVD solid electrolyte layers. Similar problems are encountered for other thin film deposition techniques such as, for instance, pulsed laser deposition, see, for instance, *Journal of Physics: Conference Series* 59, 2007, 140-143. Large area deposition of YSZ films with thicknesses in the range of 300 nm up to 1200 nm have been obtained over areas as large as 50-100 $cm^2$, but such results are only possible on non-porous substrates, for example, Si in the case of YSZ layers deposited by pulsed layer deposition.

The above-mentioned problems apply to all applications that would involve an electrolyte material in solid form and, thus, the present disclosure is not limited to the above-depicted cases. For instance, the present disclosure is also related to oxygen sensors, in particular, like those based on a working principle also called Nernst cell, where a solid electrolyte layer is sandwiched in between two metal electrodes, in particular, made of platinum. The present disclosure could also be applicable to other fields, such as, for instance, Li-ion batteries.

The objective of the disclosure is to propose a fabrication method of a layer of solid electrolyte material, which, is in particular interesting for applications, such as, for instance, electrochemical conversion devices or sensors, in particular a solid oxide fuel cell and oxygen sensors, obviating the above-mentioned detriments. Another objective is to propose a fabrication method of devices and devices comprising such a layer of solid electrolyte. In particular, applications such as, for instance, Li-ion or Na-ion or H-ion batteries, non-oxygen chemical sensors, air separation units, solid oxide electrolyzer cells (SOEC) can be envisaged. Further, another objective is to propose a structure donor substrate that allows multiple transfers of solid electrolyte material.

BRIEF SUMMARY

The present disclosure relates to a method of providing a layer of solid electrolyte by a layer transfer technique from a host substrate.

In particular, the present disclosure relates to a method of manufacturing a device comprising a solid electrolyte layer, characterized that it comprises providing a host substrate including a crystalline solid electrolyte layer, and transferring the crystalline solid electrolyte layer from the host substrate to a receiver substrate.

Further advantageous embodiments relate to a method of providing a layer of solid electrolyte characterized in that the host substrate comprises either a bulk substrate of crystalline solid electrolyte material or a donor layer of crystalline solid electrolyte provided on a support substrate.

Further advantageous embodiments relate to a method of providing a layer of solid electrolyte characterized in that the donor layer of solid electrolyte is provided on the support substrate by a deposition technique, in particular chemical vapor deposition, or, independently, by a second layer transfer technique similar to the one already outlined from another donor substrate.

Further advantageous embodiments relate to a method of providing a layer of solid electrolyte wherein the layer transfer technique comprises a step of assembling the host substrate to a receiver substrate, the solid electrolyte layer being between the substrates, and a step of thinning the host substrate.

Further advantageous embodiments relate to a method of providing a layer of solid electrolyte wherein the step of thinning comprises a step of formation of a zone of weakness in the host substrate so as to define a portion of the host substrate comprising the layer to be transferred and a step of detaching at the zone of weakness so as to transfer the portion to the receiver substrate.

Further advantageous embodiments relate to a method of providing a layer of solid electrolyte wherein the step of formation of a zone of weakness is obtained by implantation of atomic and/or ionic species.

Further advantageous embodiments relate to a method of providing a layer of solid electrolyte wherein the step of formation of a zone of weakness comprises formation of a release layer in the host substrate, the release layer being activated during the step of detaching in a way that detaching occurs.

Further advantageous embodiments relate to a method of providing a layer of solid electrolyte wherein the detaching step is obtained by at least one of: annealing, application of thermal stress, application of mechanic stress, application of irradiative means, in particular a laser beam, and etching.

Further advantageous embodiments relate to a method of providing a layer of solid electrolyte wherein the solid electrolyte material has ionic conductivity, in particular for hydrogen, oxygen, lithium or natrium ions, above 0.01 S/cm.

This is particularly advantageous in order to be able to decrease the operating temperature of certain device applications such as, for instance, SOFC, as the ionic conductivity is a temperature dependent parameter. The present disclosure allows adaption of the materials properties of the electrolyte layer in order to be able to tune such parameters, for instance, the ionic conductivity reaching a certain predetermined value at any wished temperature. Thus, even at operating temperatures below 600° C., more preferentially below 450° C., one is able to obtain high ionic conductivity of above 0.01 S/cm.

Further advantageous embodiments relate to a method of providing a layer of solid electrolyte wherein the layer of solid electrolyte has a thickness in the range of 10 nm up to 100 µm with a variation in thickness below 5%, more preferentially below 1%.

Further advantageous embodiments relate to a method of providing a layer of solid electrolyte wherein the layer of solid electrolyte has a defect density below a predetermined level, in particular lower than $5/cm^2$.

Further advantageous embodiments relate to a method of providing a layer of solid electrolyte wherein the layer of solid electrolyte is a monocrystalline layer.

Further advantageous embodiments relate to a method of providing a layer of solid electrolyte wherein the material of the solid electrolyte layer is a perovskite material and/or is chosen among the group of zirconia, ceria, gallates, and/or alumina.

Further advantageous embodiments relate to a method of providing a layer of solid electrolyte wherein after transfer of the solid electrolyte layer onto the receiver substrate, there remains a portion of the host substrate, which is further usable as host substrate for a subsequent transfer of a solid electrolyte layer.

Further, the present disclosure also relates to a device, in particular a chemical sensor, a fuel cell, an electrolyzer, a gas separation unit, or a battery, comprising a layer of solid electrolyte obtained by transferring as disclosed herein.

Further, the present disclosure also relates to a method of fabrication of a solid oxide fuel cell comprising an anode, a cathode, a layer of solid electrolyte in between the anode and cathode, and electrodes on the side of the anode and the cathode opposing the layer of solid electrolyte, comprising carrying out the method according to the present disclosure for transferring a crystalline solid electrolyte layer onto the anode and/or the cathode.

Further, the present disclosure also relates to a method of fabrication of an oxygen sensor comprising two electrodes and a layer of solid electrolyte in between the two electrodes comprising carrying out the method according to the present disclosure for transferring a crystalline solid electrolyte layer onto the anode and/or the cathode.

Further, the present disclosure also relates to a method of fabrication of a battery comprising an anode, a cathode, a layer of solid electrolyte in between the anode and cathode, and electrodes on the side of the anode and the cathode opposing the layer of solid electrolyte, comprising carrying out the method according to the present disclosure for transferring a crystalline solid electrolyte layer onto the anode and/or the cathode.

Further, the present disclosure also relates to a method of fabrication of a donor structure comprising a donor substrate having a main surface and a plurality of crystalline solid electrolyte layer portions on the main surface, wherein each of the plurality of crystalline electrolyte layer portions is obtained by the method according to the present disclosure for transferring a crystalline solid electrolyte layer onto the main surface of the donor substrate.

This method of fabrication has the advantage that it opens up the way to the possibility to provide high quality solid electrolyte material layers with well-defined properties such as, for instance, very good thickness uniformity, high ionic conductivity, and very good electrically insulating properties and down to very low thickness of the layer.

The method also gives more flexibility with respect to existing fabrication methods because the materials properties of the transferred layer can be tuned independently, and in particular these properties would not depend on the properties of the electrode materials (morphology, porosity, defect or dislocation density) as the electrolyte is not directly grown on the electrode.

The interface properties, in particular already improved for molecular or direct bonding, are further enhanced due to the possibility of adapted surface treatments on both the electrode and the electrolyte layer, in particular with respect to the roughness or also the chemical surface termination of these layers.

Various embodiments of the present disclosure are described in more detail below by way of example with reference to the drawings. The described embodiments are only possible configurations in which the individual features may, however, be implemented independently of each other or may be omitted. Similar elements illustrated in the drawings are provided with the same reference sign. For steps, an additional S at the beginning is added. Parts of the description relating to equal elements or steps illustrated in the different drawings may be left out.

DETAILED DESCRIPTION

It will be apparent to the skilled person that features and alternatives from any of the embodiments can be combined, independently of each other, with features and alternatives of any other embodiment within the scope of the present disclosure.

Figure 1A:
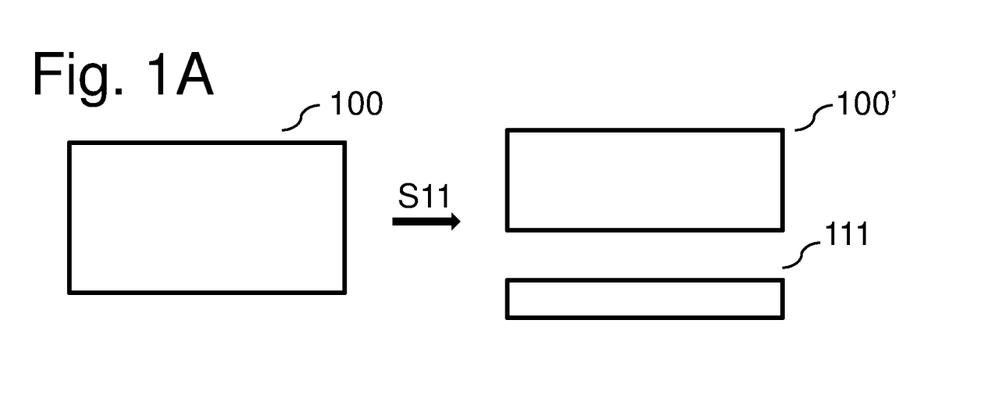
FIG. 1A schematically illustrates a method for providing a layer of solid electrolyte by a layer transfer technique in accordance with embodiments of the present disclosure.

FIG. 1A schematically shows a method for providing a layer of solid electrolyte 111 by a layer transfer technique S11 in accordance with embodiments of the present disclosure. It is schematically indicated that the layer of solid electrolyte 111 is separated from a host substrate 100, thus leaving behind a remaining host substrate 100'. It will become clear from the discussion below regarding various embodiments of the present disclosure in which way the layer of solid electrolyte 111 may be comprised in the host substrate 100 and in which way the layer of solid electrolyte 111 is separated.

Figure 1B:
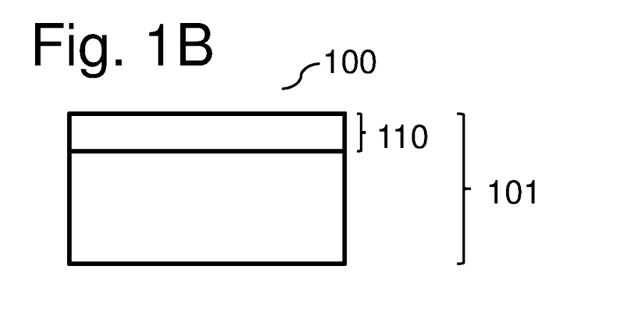
FIGS. 1B, 1C, and 1D schematically illustrate a host substrate for a method for providing a layer of solid electrolyte by a layer transfer technique in accordance with embodiments of the present disclosure.

FIG. 1B schematically shows a host substrate 100 which is entirely formed by a bulk substrate 101. It is also schematically indicated in FIG. 1B, a donor layer of solid electrolyte 110, which is present close to one face of the host substrate 100. It will become clear from the description below in which way such a donor layer of solid electrolyte 110 can be defined in the host substrate 100.

Figure 1C:
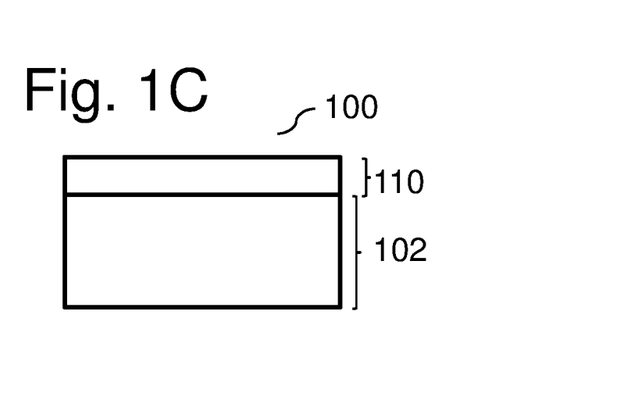

FIG. 1C schematically shows a host substrate 100 which comprises a support substrate 102 on which is provided a donor layer of solid electrolyte 110. Such a donor layer of solid electrolyte 110 might be obtained by several techniques such as, for instance, but not limited to, pulsed laser deposition, physical vapor deposition, chemical vapor deposition, spray coating, evaporation, sputtering, or atomic layer deposition. The choices of the support substrate 102 as well as the growth technique directly influence the materials properties of the donor layer of solid electrolyte 110 and these properties can be well adjusted depending on the envisaged application.

Figure 1D:
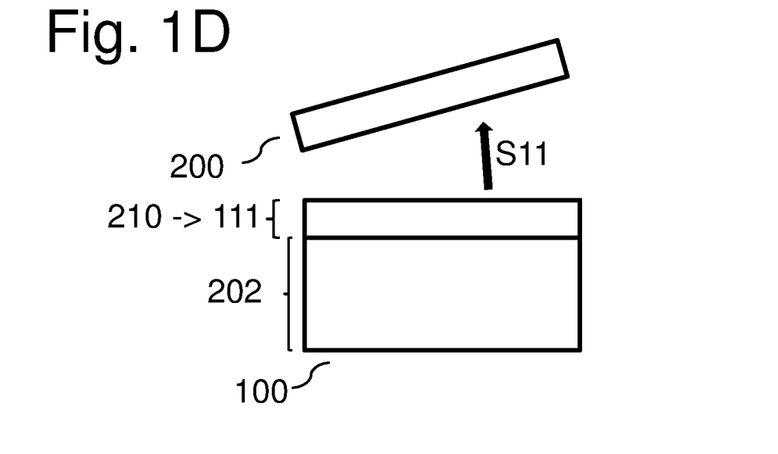

FIG. 1D schematically shows a host substrate 100 which comprises a support substrate 202 on which is provided a donor layer of solid electrolyte 210 by a layer transfer technique S11 from a donor substrate 200 in accordance with the present disclosure. This gives the opportunity and flexibility to take into account the preparation of both faces of the layer of solid electrolyte 111, obtained by the layer transfer technique S11 in accordance with the present disclosure from the respective donor layer of solid electrolyte 210, by surface treatments or thermal treatments for which the initial donor substrate would not have been suitable before integration of the layer of solid electrolyte 111 in its final stack of layers or device.

Materials of choice for the solid electrolyte are doped (dopant X) zirconia-based materials ($ZrO_2$—X). As for dopants a large number of divalent and trivalent metal oxides ($Y_2O_3$, $Yb_2O_3$, $Sc_2O_3$, CaO, MgO, etc.) may be selected. In an advantageous embodiment, the monocrystalline phase of such materials is preferred due to higher crystalline quality and lower defect density with respect to the polycrystalline phase. The grains of the latter, in turn, stabilize the high temperature tetragonal or cubic phase to room temperature. In particular, in the $ZrO_2$—$Y_2O_3$ system, 2.5 mol % $Y_2O_3$ stabilizes the tetragonal (t) and 8.5 mol % $Y_2O_3$ the cubic (c) phase at 1000° C. The tetragonal phase is usually found as a small grain (0.5 pm) material with high mechanical strength, toughness and thermal shock resistance, and an ionic conductivity of 0.055 $Scm^{-1}$ at 1000° C. In comparison, the large grained cubic phase has lower strength (at RT) but a conductivity of around 0.15 $Scm^{-1}$ at 1000° C. In the case of polycrystalline material one should note that an advantageous embodiment could consist in texturing the material, that is to align the orientation of the grains with respect to the surface, which is advantageous because of a better homogeneity of the material, a better control of the thickness uniformity and roughness, as well as a better reproducibility on a manufacturing perspective. However, monocrystalline material is preferably used. In polycrystalline materials the thickness should be chosen preferentially higher than the average grain size in order to ensure an overall dense material.

However, the present disclosure is not limited to these kind of materials, and one could envisage other materials such as, for instance, $BaY_{0.2}Zr_{0.8}O_{3-\delta}$ or doped (CaO, $Y_2O_3$, $Sm_2O_3$, $Gd_2O_3$) ceria-based materials, in particular Gadolinia-doped ceria, or, for instance, known perovskite-based lanthanum gallate doped with strontium and magnesium (LSGM). One should note that ceria-based materials would suffer oxygen loss and need to be protected on the anode side. Further, it should be noted that LSGM, for instance, is incompatible with certain anode materials likely used for SOFC such as, for instance, NiO. Such materials deficiencies and incompatibilities indicate that an alternative fabrication method is required, which is able to counteract such problems. For the present disclosure this is the providing of a suitable protective coating situated between the anode and the ceria-based materials or the LSGM and certain anode materials.

The possibility to use either bulk substrates 101 or providing a donor layer of solid electrolyte 110 on a support substrate 102 independent on constraints directly imposed by growth on materials used in the final device offers an outstanding flexibility in design and quality of the layer of solid electrolyte 111 integrated in the final device. It is thus possible to keep the defect density in such layer of solid electrolyte 111 below $5/cm^2$, the thickness below 2 µm while achieving a thickness uniformity better than 5%, and that even in case of polycrystalline materials. Ionic conductivity values may be as high as 0.01 S/cm, in particular while maintaining a good insulating behavior for electrons and a high gas tightness for involved gas species.

Figure 2:
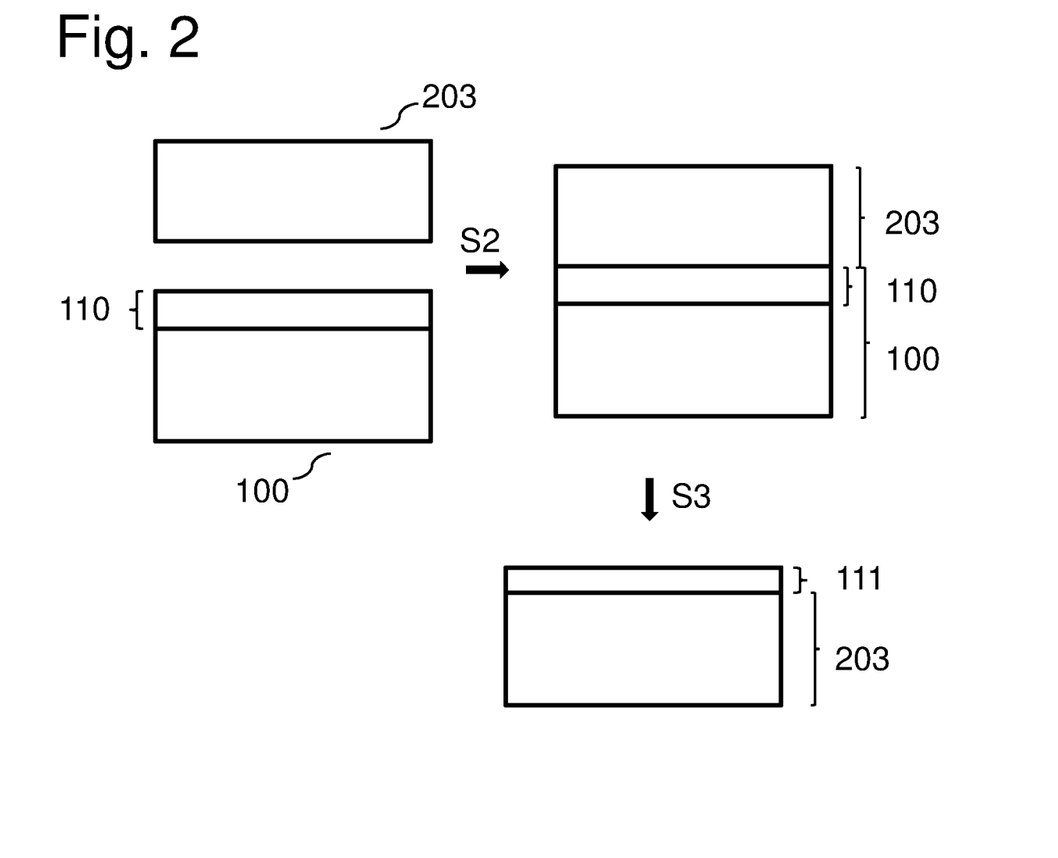
FIG. 2 schematically illustrates a method for providing a layer of solid electrolyte by a layer transfer technique in accordance with embodiments of the present disclosure.

FIG. 2 schematically shows an assembling step S2 of host substrate 100 comprising a donor layer of solid electrolyte 110 with a receiver substrate 203 and a step of thinning S3 of the assembled structure leading to a layer of solid electrolyte 111 remaining on the receiver substrate 203. The assembling step S2 can be obtained by any bonding technique such as, for instance, direct bonding, thermocompression bonding, eutectic bonding, ceramic mediated bonding, or any other known technique suitable. A direct bonding is preferred as it provides long term stability of the bond and a defect free bonding interface showing good electrochemical behavior, in particular high ionic conductivity and low electrical conductivity. Prior to the step of assembling S2, the surface of the receiver substrate 203 as well as the donor layer of solid electrolyte 110 may be prepared, for instance, by a step of, or a combination of steps of etching, grinding, polishing, in particular chemical-mechanical polishing, or any other surface treatment technique, or even thermal treatment, in order to decrease the roughness of the surface and/or the number of defects present at the surface. The thinning step S3 schematically displayed in FIG. 2 might be obtained by several techniques; some of which will be described below in more detail. For instance the step of thinning S3 might be obtained by a combination of grinding and subsequent etching of the host substrate 100, which might be interesting if the material of the host substrate 100 is rather cheap and highly available so that such a sacrificial step would be cost efficient with respect to industrialization. Other possibilities of the step of thinning S3 might be the fracture along a zone of weakness 320, for instance, obtained by implantation of ionic and/or atomic species or, for instance, obtained by the introduction of a buried lift-off layer 330 selectively sensitive to etching, defining thus a donor layer of solid electrolyte 110, which can be transferred to the receiver substrate 203. Other possibilities of the step of assembling S2 might be providing the receiver substrate 203 by a deposition sequence whereby any technique of deposition, like vapor phase or liquid phase deposition, sputtering, evaporation, spray deposition, spin coating, for instance, may be implemented.

Figure 3A:
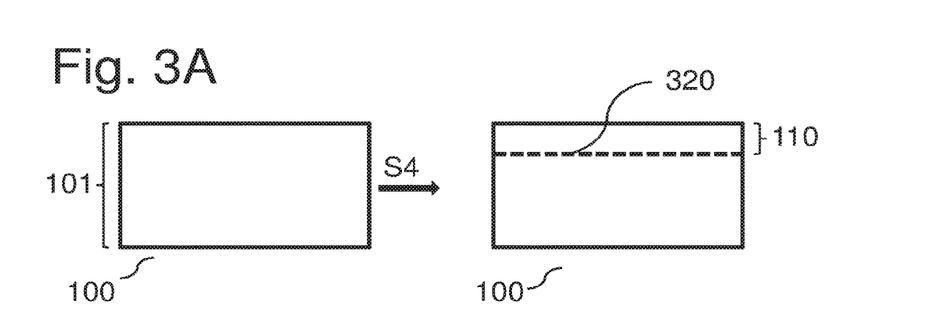
FIGS. 3A, 3B, and 4 schematically illustrate the formation of a zone of weakness for a method for providing a layer of solid electrolyte by a layer transfer technique in accordance with embodiments of the present disclosure.
Figure 3B:
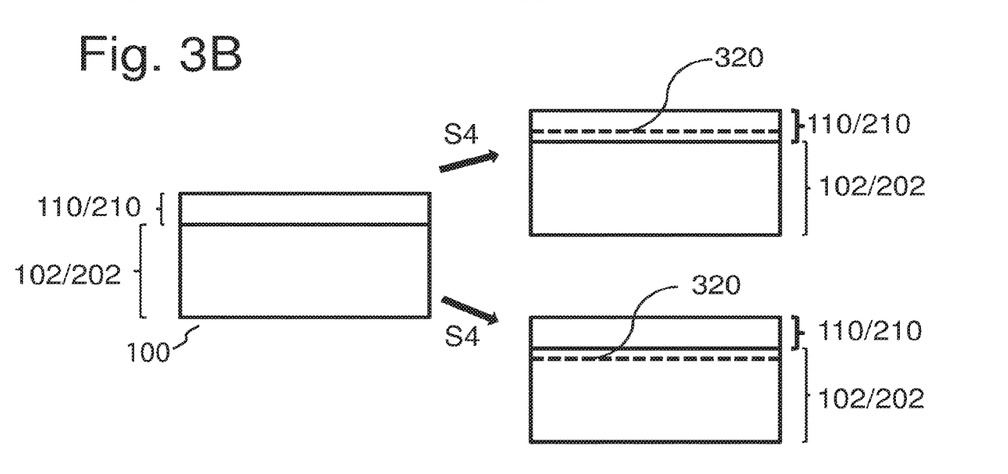

FIG. 3A schematically refers to the case shown in FIG. 1B of a host substrate 100 formed entirely by a bulk substrate 101, and shows the step of formation S4 of a zone of weakness 320 by implantation of ionic and/or atomic species, in particular H or He or a combination thereof, through one face of the host substrate 100, thereby defining the donor layer of solid electrolyte 110. In FIG. 3B similar technical aspects are schematically shown which, however, refer to the cases shown in FIGS. 1C and 1D where a donor layer of solid electrolyte 110 or 210 is provided on a support substrate 102 or 202, respectively. As such, a donor layer of solid electrolyte 110 might be not of same material as the support substrate 102 or 202, the zone of weakness 320 can be either formed in the donor layer of solid electrolyte 110 or 210 or in the support substrate 102 or 202, or in-between in an intermediate layer.

Typically, implantation is realized in a range of implantation energies from 50 keV to 1 MeV with an implantation dose ranging typically from $2 \times 10^{16}$ to $12 \times 10^{17}$ H+/cm² in case of H+ ions (and/or He ions), which permits to define a zone of weakness 320 at a depth of about 0.2 to 10 μm below the implanted surface.

Figure 4:
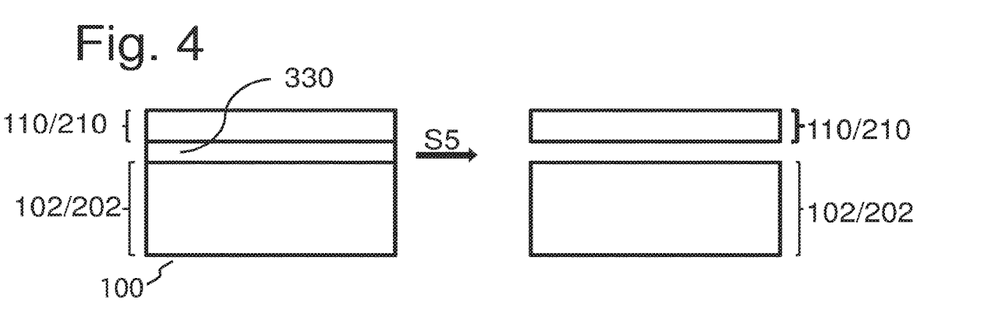

FIG. 4 schematically shows another advantageous embodiment with respect to the step of thinning S3 depicted in FIG. 2. FIG. 4 shows a host substrate 100 comprising a support substrate 102 or 202 and a donor layer of solid electrolyte 110 or 210, in between of which a release layer, often also called lift-off layer, 330 is formed which acts as a zone of weakness 320 for the step of thinning S3. Such a lift-off layer 330 might be introduced either during the growth of the donor layer of solid electrolyte 110 on the support substrate as described with regard to the embodiment schematically shown in FIG. 1C, or during the layer transfer technique S11 as schematically shown in FIG. 1D whereby the lift-off layer 330 is provided on the support substrate or the layer to be transferred prior to the transfer, or a combination thereof.

After assembling the host substrate 100 (of FIG. 3A, 3B, or 4) with the receiver substrate 203 as shown in FIG. 2, a step of thinning S3 with respect to the formed zone of weakness 320 can be performed by annealing or by application of thermal and/or mechanical stress, for instance, a thermal treatment realized in the range of 200° C. to 900° C. for a duration ranging from seconds to hours might induce fracture at the zone of weakness 320, allowing thus a step of detachment S5 to occur. The insertion of a blade can act as application of mechanical stress. Other possibilities might be a step of detaching S5 by application of irradiative means, in particular a laser beam. This could be achieved by a change in the absorption occurring by the presence of the implanted species at the zone of weakness and application of a laser beam tuned to this selective peak in absorption. Another possibility could be a selective absorption in the lift-off layer 330, which dissociates under such selected irradiation. Preferentially, the rest of the host substrate 100 is substantially transparent to such irradiation, and even more preferentially, the rest of the host substrate 100 as well as the donor layer of solid electrolyte 110 are protected from eventually occurring heat dissipation in the region of the lift-off layer 330 during such irradiation, for instance, by presence of thermal diffusion barrier layers in between the lift-off layer 330 and the adjacent layers. Another possibility for the step of detaching S5 is the application of a selective etch solution to the zone of weakness 320, easily achievable by an adequate choice of material for the lift-off layer 330, for instance.

The main advantage of the layer transfer technique S11 involving a step S4 of formation of a zone of weakness and a detaching step S5 is the possibility to reuse the remaining host substrate 100' for further fabrication. This is especially noteworthy whenever the cost of such substrates is rather high. After a rather simple surface treatment, for instance, chemical-mechanical polishing, including but not limited to, of the remaining host substrate 100', the latter of which can be reused as the host substrate 100 or support substrate 102, according to the present disclosure. However, one can also imagine a scenario in which the material of the host substrate 100 is rather cheap, and reuse is not of real economic interest. In such a configuration, the thinning step S3 can be equivalent to the removal of the host substrate 100 by any conventional thinning technique (etching, grinding, or polishing).

Further advantageous embodiments might comprise multiple transfers.

One embodiment is thereby related to subsequently performed layer transfer from the same host substrate 100. This is advantageous whenever a donor layer of solid electrolyte 110 can be provided as a rather thick layer while maintaining suitable high quality. Surface treatments after a layer transfer on the remaining host substrate 100' might be crucial in order to optimize the remaining host substrate 100' for a subsequently performed transfer of another layer of solid electrolyte according to the present disclosure.

Another embodiment is related to the use of an intermediate handling substrate. From the host substrate 100 the layer of solid electrolyte 111 is transferred to an intermediate handling substrate, which itself can act subsequently as new host substrate. This is schematically indicated in FIG. 1D. This is advantageous whenever, for instance, the crystallographic termination of the layer of solid electrolyte 111 is different on both sides of the layer, which might play a role.

A transfer from the intermediate handling substrate to the receiver substrate 203 does thus not change such termination or orientation, allowing further optimization and giving much more flexibility in the materials choice. Other reasons can justify the use of an intermediate handling substrate. For instance, as it allows to decorrelate the step of detaching the electrolyte layer from its original host substrate and the step of assembling it on the final support substrate, more flexible process windows can be obtained. Another reason would be to allow for more flexibility regarding surface treatments of the electrolyte layer, and this for both of its two faces.

Figure 5:
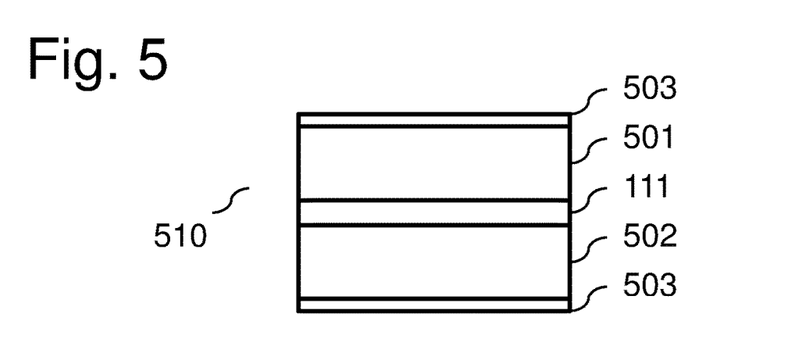
FIG. 5 schematically illustrates an electrochemical conversion device in accordance with embodiments of the present disclosure.

FIG. 5 schematically illustrates an electrochemical conversion device 510 comprising contact structures 503, an anode 501, a cathode 502, and a layer of solid electrolyte 111 arranged in between the anode 501 and cathode 502. As already mentioned before, the electrochemical conversion device 510 is not limited to the application of SOFC, wherein a layer of solid electrolyte 111 is used, but may also be related to similar systems such as, for instance, Li-ion batteries. In the case of SOFC, the contact structures 503 not only provide electronic conduction but also comprise means of transport of gas from fuel, whereas in Li-ion batteries essentially electronic conduction is necessary as the ions are transported from anode to cathode and intercalated therein and vice-versa due to the electrochemical potential difference but no reduction or oxidation process occurs leading to or using volatile species as oxygen or hydrogen.

Depending on the application, the materials involved are chosen appropriately. In the case of SOFC, the anode materials might be chosen among porous Ni-YSZ cermet, Cu-YSZ cermet, strontium titanate or others commonly known, whereas cathode materials might be chosen among perovskite-based $LaMnO_3$, accompanied by a ceria-based interlayer to assure chemical stability versus YSZ electrolyte material. Other materials for the cathode such as, for instance, $La_{0.8}Sr_{0.2}MnO_3$ (LSM) or $La_{0.5}Sr_{0.5}CoO_3$ or $Ln_{1.6}Sr_{0.4}Co_{1-y}Fe_yO_{3-\delta}$ (LSCF, where Ln=La, Sm, Nd, Gd, Dy) or $Ba_{1-x}Sr_xCo_{1-y}Fe_yO_{3-\delta}$ (BSCF) can be chosen.

In case of Li based batteries, the solid electrolyte material of choice is LiPON or $Li_3PO_4$, anode and cathode materials might be chosen of those well known in the art, such as, for instance, $LiCO_2$, Li, TiOS.

Further illustration is given in an exemplary manner for embodiments in relation with FIG. 5. However, the present disclosure is not limited to such an example, and technical aspects are of interest for other applications. In relation with FIG. 5, a classical architecture well-known for SOFC is presented, with an anode 501 made of NiO—YSZ, a cathode 502 made of LSM, and a layer of solid electrolyte 111 made of monocrystalline YSZ. Standard electrodes are used as contact structures 503.

The process starts by providing the anode 501 by commonly known techniques such as, for instance, sintering. Optionally, the anode is supplied with its electrode already formed, or the corresponding electrode can be formed later in the process. Advantageously, a planarization step is performed on the anode 501 in order to provide a surface having low roughness, in particular below 0.6 nm rms as measured by Atomic Force Microscopy (AFM), which is much more suitable for the assembling step via bonding techniques. However, one might alternatively provide a planarization layer and/or bonding layers as discussed elsewhere in the specification.

The host substrate 100 from which the layer of solid electrolyte 111 is obtained is made of YSZ in a monocrystalline phase, for instance, of square form with dimensions of 20×20 mm. Implantation of hydrogen H+ is performed on the monocrystalline YSZ in order to obtain the zone of weakness 320 necessary for a subsequent transfer by splitting. Typically such implantation is performed using implantation energies ranging from 50 keV to 1 MeV, implantation doses ranging from $2 E+16/cm^2$ to $1.2 E+17/cm^2$, which lead to a zone of weakness 320 separating the donor layer of solid electrolyte 110 having a thickness, which thus depends on the exact implantation parameters, ranging from 0.2 to 10 µm.

After the assembly of the donor layer of solid electrolyte 110 to the anode 501, splitting at the zone of weakness 320 is provided by a thermal treatment with temperatures ranging from 300° C. to 1000° C. for a duration ranging from seconds to hours depending on the temperature of the anneal. After transfer obtained by such splitting, an optional planarization step on the transferred layer might be suitable for the subsequent providing of the cathode 502. The LSM cathode material might be directly deposited on the transferred layer by any known deposition means, like tape casting, sintering, vapor phase or liquid phase deposition, sputtering, evaporation, sintering, spray coating, sol-gel technique, serigraphy, etc., or one could assemble with a separately provided cathode by above-mentioned bonding and/or transfer techniques applied to the cathode. For instance, assembly could be obtained by lamination or direct bonding of an LSM substrate on the above-mentioned planarized YSZ layer, which has been transferred on the anode according to embodiments of the present disclosure. A thermal treatment with temperatures ranging from 500° C. to 1400° C. with a duration ranging from seconds to hours depending on the temperature of the anneal can optionally be performed in order to increase the overall mechanical stability of the assembled structure. Finally, metal electrodes are provided on both the anode (if not already formed) and cathode side by techniques commonly known.

The method of providing a layer of solid electrolyte 111 according to embodiments of the present disclosure has the advantage that the method can be used to avoid incompatibilities of the material chosen for the layer of solid electrolyte 111 and the materials chosen for the anode 501 or cathode 502.

One type of incompatibility might be based on that the anode 501 and cathode 502 have a certain type of material and morphology, for instance, a high porosity, in order to allow optimized performance in the chosen application. For instance, high porosity is chosen in case of SOFC in order to allow penetration of oxygen or hydrogen in the respective material layer, and also to increase the ionic conductivity of the respective ions to the layer of electrolyte material. However such a rather inhomogeneous morphology negatively impacts layers that would have been grown upon such anode or cathode material and, thus, does not allow high quality, for instance, monocrystallinity, and low defect densities in accordance with the present disclosure.

Other incompatibilities concern thermal budget applied during growth or deposition of certain layers which may have detrimental effects as diffusion or phase changes in the underlying structure.

Also, the flexibility in the fabrication method of such electrochemical conversion devices 510 is increased as the layer of solid electrolyte 111 may be provided on either the anode 501 or the cathode 502. Prior to such assembly, the layer of solid electrolyte 111 and the other structure may undergo treatments in order to improve the interface after assembly, such as, for instance, polishing in order to decrease the roughness, making it more suitable, for instance, for a bonding process, in particular direct bonding.

Further, it is also possible to provide bonding layers and/or planarizing layers before assembly on the layer of solid electrolyte 111 and/or the other structure in order to provide better bonding quality.

For instance, the layer of solid electrolyte 111 may be provided on the anode 501, but similar reasoning would apply to a provision on the cathode 502. Thermal treatments after or during the assembly might be necessary in order to ensure the mechanical integrity of the assembled structure, with temperatures ranging from 500° C. up to 1400° C. and treatment duration ranging from seconds to hours depending on the temperature of the anneal. Subsequently one has either the choice to assemble a structure comprising the cathode 502 and its contact structure 503 to the free face of the layer of solid electrolyte 111. Or, one has the choice to grow the respective cathode 502 and its contact structure 503 on the free face of the layer of solid electrolyte 111 if no incompatibilities between the growth or deposition technique, such as, for instance, a too high thermal budget applied during such growth for the other counterpart, exists. Such flexibility also shows by the fact that each of the constituent parts of the electrochemical conversion device 510 can be subjected to its proper individual treatment, for instance, thermal annealing, chemical treatment, diffusion doping, prior to the assembling with the other constituent parts of the electrochemical conversion device 510. Anode 501 and cathode 502, for instance, can thus be optimized in terms of catalytic activity for oxygen dissociation and incorporation reactions in cathode 502 and for electrochemical oxidation of $H_2$ or CO and other fuel processing in anode 501. Further, the electronic conductivity of both anode 501 and cathode 502 may be increased due to the flexibility in treatments; the same applies to the chemical and mechanical stability with respect to the other constituents. For instance, an alignment of CTE (coefficient of thermal expansion) throughout the electrochemical conversion device 510 might be of interest in order to increase the mechanical stability and, thus, lifetime of the device at the high operating temperature. Such an attunement of CIE might be obtained by the choice of the material. Thus, an overall optimized device is obtained.

As described above, the present disclosure is related to applications involving a layer of solid electrolyte, such as, for instance, SOFC, which is related to generate electricity (and heat) by the input of combustibles or fuels like, for instance, hydrogen and oxygen. It becomes immediately clear that the inverse functionality, that is the generation of combustibles by use of electricity and electrolysis, is possible using the same configuration and, thus, all descriptive elements of the specifications apply, as schematically shown in FIG. 5. The application thus relates also to solid oxide electrolyzer cells (SOEC).

For the fuel cell mode, as well as the reversed electrolyser mode, it is well known that protonic (H+ ion) conduction can be used instead of oxygen ions conduction. Those are known under the terminology Proton exchange membrane fuel cells (PEMFC). The present disclosure can be applied to such protonic systems too, where the protonic membrane is obtained by a layer transfer technique from a host substrate, instead of, for instance, using an already formed polymer membrane.

Membranes of solid oxide electrolyte can also be used for gas separation, like oxygen gas separation or hydrogen gas separation. In these cases, it may be necessary that the electrolyte not only allows for ionic conduction through the membrane but also for opposite charge carrier conduction like electrons or holes. Choice of the materials for the membrane depends on the targeted gas species. In the case of oxygen, for instance, perovskites are frequently used, like $Sr_{0.8}La_{0.2}Fe_{0.2}CO_{0.8}O_{3.6}$, $SrCo_{0.8}Fe_{0.2}O_{3.6}$ or $Sr_{0.5}Ba_{0.5}Co_{0.8}Fe_{0.2}O_{3.6}$. As another example, perovskites can also be used in the case of hydrogen (protons), like $LaScO_3$ and, more generally, oxides in the form $ACe_{1-x-y}X_xY_yO_3$ where A=Ba, Sr; X and Y=Y, Yb, Zr, Tm. Other materials like $SrCeO_3$, $BaCeO_3$, $CaZrO_3$, $SrZrO_3$ can also be used. In these applications too, one of the main challenges is to increase in a controlled way the conductivity of the membrane, pushing towards thinner and more uniform and denser layers. Among the applications, such membranes can be found in Air Separation Units for pure oxygen gas extraction from ambient air, in natural gas refining where $CO_2$ is removed after hydrogen extraction, and in many others.

Figure 6:
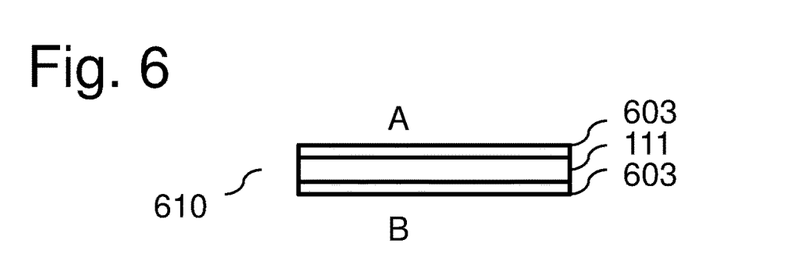
FIG. 6 schematically illustrates an electrochemical conversion sensor in accordance with embodiments of the present disclosure.

FIG. 6 schematically shows how a solid electrolyte can be used in a chemical sensor, like an oxygen sensor. In the automotive world, such oxygen sensors may serve, for instance, to accurately define the air/fuel ratio in order to optimize the control of motor combustion efficiency. Oxygen sensors may be placed in the exhaust system or earlier in the chain before the combustion chamber. Based on the utilization of ion conducting materials, several different principles do exist as to the working mechanisms of such sensors. One of them is based on the Nernst effect where an electrical potential is created across the sensor when there is an oxygen pressure ($pO_2$) gradient. As schematically shown in FIG. 6, a layer of solid electrolyte 111 is separating both sides A and B of an electrochemical conversion sensor 610. On both sides of the layer of solid electrolyte 111 there are contact structures 603 provided, using, for instance, well-known techniques and materials suitable for this sort of application. In particular, the air tightness of the layer of solid electrolyte 111 is important and might be tuned by the layer transfer technique S11 of the present disclosure, as the layer could be prepared in high quality on substrates rather than made of the material of the contact structures 603. The latter, however, need certain porosity for gas in order to allow contact with the layer of solid electrolyte 111. A reference chamber of known oxygen content and pressure may be used on one side of the sensor. A second type of oxygen sensor does measure the variation of the conductivity of the ceramic as a function of the oxygen pressure ($pO_2$). Whatever the principle upon which the sensor is based, its accuracy and its sensitivity are critically depending on the control of the properties and dimensions of the ion-conducting membrane, which makes the disclosure a real advantage. On the same principles, other gas than oxygen may also be detected using gas sensors and ion conducting membranes.

Figure 7:
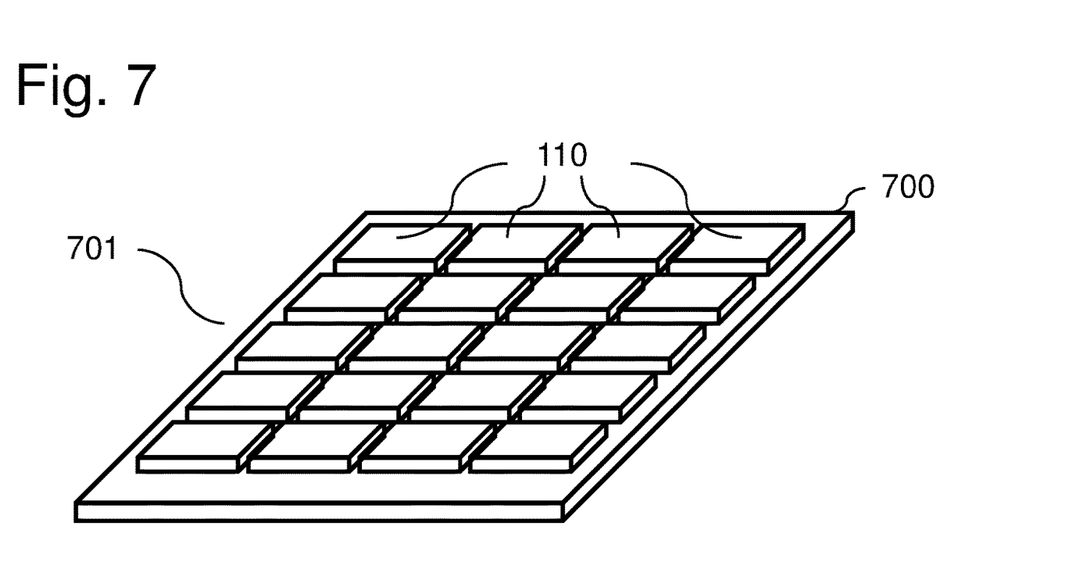
FIG. 7 schematically illustrates a donor structure or also called a "structured donor substrate" in accordance with embodiments of the present disclosure.

FIG. 7 schematically illustrates one advantageous embodiment, an advanced structured donor substrate, that is, a structured donor substrate 701 comprising multiple donor layers of solid electrolyte 110 assembled to a main surface of a large-scale donor substrate 700 with a size large enough to accommodate multiple donor layers of solid electrolyte 110. The dimensions and shapes of the respective layers and substrates depicted in FIG. 7 are non-limiting and only chosen for ways of illustration. Such a donor structure, or structured donor substrate 701 is advantageous for large-scale applications as a series connection of multiple SOFC in a final SOFC module. A high density of donor layers of solid electrolyte 110 can be easily obtained, the providing of the donor layers of solid electrolyte 110 on the donor substrate 700 can thereby be obtained by one of the techniques explained with respect to the present disclosure, or by application of ceramic glue or other suitable adhesive materials as, for instance, polymer based materials. One multiple transfer of layers of solid electrolyte 111 from a single structured donor substrate 701, as shown in FIG. 7, on a receiver substrate 203 (FIG. 2) of at least the same size offers the possibility to easily integrate SOFC fabrication in an industrially viable environment, with the possibility to process in parallel large areas of electrolyte membranes.

In most of the examples treated so far, YSZ, in particular monocrystalline YSZ, was chosen as the solid electrolyte material. Other solid electrolyte material may be considered depending on the application and on the species to be selectively transported through the electrolyte. In particular, for electrochemical battery applications, Li-ion or Na-ion conductivity may be exploited too. For the latter, NaS batteries usually use β-Alumina for the solid electrolyte material. An alternative to the realization of such material by deposition is to use layer transfer techniques described in the present disclosure, based on the hypothesis that monocrystalline or high quality polycrystalline donor material are also developed separately. The same holds for Li-ion batteries, with solid electrolyte materials like LiPON or $Li_3PO_4$. Other famous electrolyte materials, of interest here, are $Na_3Zr_2Si_2PO_{12}$ (NaSiCON), $Na_2CO_3$ and AgI.

What is claimed is:

1. A method of providing a layer of solid electrolyte, comprising:
   providing a host substrate including a crystalline solid electrolyte layer; and
   transferring the crystalline solid electrolyte layer from the host substrate to a receiver substrate;
   wherein transferring the crystalline solid electrolyte layer from the host substrate to the receiver substrate comprises:
      assembling the host substrate with a receiver substrate, the solid electrolyte layer being between the host substrate and the receiver substrate; and
      thinning the host substrate, wherein thinning the host substrate comprises:
         forming a zone of weakness in the host substrate so as to define a portion of the host substrate comprising the layer to be transferred, wherein forming the zone of weakness comprises implanting atomic and/or ionic species into the host substrate; and
         detaching at the zone of weakness so as to transfer the portion to the receiver substrate.

2. The method of claim 1, wherein the host substrate comprises either a bulk substrate of crystalline solid electrolyte material or a donor layer of crystalline solid electrolyte disposed on a support substrate.

3. The method of claim 2, wherein the host substrate comprises a donor layer of crystalline solid electrolyte deposited on a support substrate.

4. The method of claim 1, wherein detaching at the zone of weakness so as to transfer the portion to the receiver substrate comprises at least one of: annealing the host substrate, application of thermal stress to the host substrate, application of mechanic stress to the host substrate, irradiating the host substrate, or etching the host substrate.

5. The method of claim 1, wherein the solid electrolyte material has an ionic conductivity above 0.01 S/cm for at least one of hydrogen, oxygen, lithium or natrium ions.

6. The method of claim 1, wherein the layer of solid electrolyte has a thickness in a range extending from 10 nm to 100 μm with a variation in thickness below 5%.

7. The method of claim 1, wherein the layer of solid electrolyte has a defect density below $5/cm^2$.

8. The method of claim 1, wherein the layer of solid electrolyte is a monocrystalline layer.

9. The method of claim 1, wherein the material of the solid electrolyte layer comprises a perovskite material.

10. The method of claim 1, wherein the material of the solid electrolyte layer comprises a material from the group consisting of zirconia, ceria, gallates, and alumina.

11. The method of claim 1, wherein a portion of the host substrate usable as a host substrate for a subsequent transfer of a solid electrolyte layer remains after transfer of the solid electrolyte layer onto the receiver substrate.

12. The method of claim 1, further comprising fabricating a solid oxide fuel cell including an anode, a cathode, the layer of solid electrolyte in between the anode and the cathode, and electrodes on the side of the anode and the cathode opposing to the layer of solid electrolyte.

13. The method of claim 1, further comprising fabricating an oxygen sensor comprising two electrodes and the layer of solid electrolyte in between the two electrodes.

14. The method of claim 1, further comprising fabricating a battery comprising an anode, a cathode, the layer of solid electrolyte in between the anode and cathode, and electrodes on the side of the anode and the cathode opposing the layer of solid electrolyte.

15. The method of claim 1, further comprising fabricating a donor structure comprising a donor substrate having a main surface and a plurality of crystalline solid electrolyte layer portions on the main surface, wherein each of the plurality of crystalline electrolyte layer portions is obtained by the method of claim 1.

16. A method of providing a layer of solid electrolyte, comprising:
   providing a host substrate including a crystalline solid electrolyte layer, and
   transferring the crystalline solid electrolyte layer from the host substrate to a receiver substrate;
   wherein transferring the crystalline solid electrolyte layer from the host substrate to the receiver substrate comprises:
      assembling the host substrate with a receiver substrate, the solid electrolyte layer being between the host substrate and the receiver substrate; and
      thinning the host substrate, wherein thinning the host substrate comprises:
         forming a zone of weakness in the host substrate so as to define a portion of the host substrate comprising the layer to be transferred; wherein forming the zone of weakness comprises forming a release layer in the host substrate; and
         activating the release layer and detaching at the zone of weakness so as to transfer the portion to the receiver substrate.

17. The method of claim 16, wherein the host substrate comprises either a bulk substrate of crystalline solid electrolyte material or a donor layer of crystalline solid electrolyte disposed on a support substrate.

18. The method of claim 17, wherein the host substrate comprises a donor layer of crystalline solid electrolyte deposited on a support substrate.

19. The method of claim 16, wherein detaching at the zone of weakness so as to transfer the portion to the receiver substrate comprises at least one of: annealing the host substrate, application of thermal stress to the host substrate, application of mechanic stress to the host substrate, irradiating the host substrate, or etching the host substrate.

20. The method of claim 16, wherein the solid electrolyte material has an ionic conductivity above 0.01 S/cm for at least one of hydrogen, oxygen, lithium or natrium ions.

21. The method of claim 16, wherein the layer of solid electrolyte has a thickness in a range extending from 10 nm to 100 μm with a variation in thickness below 5%.

22. The method of claim 16, wherein the layer of solid electrolyte has a defect density below $5/cm^2$.

23. The method of claim 16, wherein the layer of solid electrolyte is a monocrystalline layer.

24. The method of claim 16, wherein the material of the solid electrolyte layer comprises a perovskite material.

25. The method of claim 16, wherein the material of the solid electrolyte layer comprises a material from the group consisting of zirconia, ceria, gallates, and alumina.

26. The method of claim 16, wherein a portion of the host substrate usable as a host substrate for a subsequent transfer of a solid electrolyte layer remains after transfer of the solid electrolyte layer onto the receiver substrate.

27. The method of claim 16, further comprising fabricating a solid oxide fuel cell including an anode, a cathode, the layer of solid electrolyte in between the anode and the cathode, and electrodes on the side of the anode and the cathode opposing to the layer of solid electrolyte.

28. The method of claim 16, further comprising fabricating an oxygen sensor comprising two electrodes and the layer of solid electrolyte in between the two electrodes.

29. The method of claim 16, further comprising fabricating a battery comprising an anode, a cathode, the layer of solid electrolyte in between the anode and cathode, and electrodes on the side of the anode and the cathode opposing the layer of solid electrolyte.

30. The method of claim 16, further comprising fabricating a donor structure comprising a donor substrate having a main surface and a plurality of crystalline solid electrolyte layer portions on the main surface, wherein each of the plurality of crystalline electrolyte layer portions is obtained by the method of claim 16.

\* \* \* \* \*

UNITED STATES PATENT AND TRADEMARK OFFICE
CERTIFICATE OF CORRECTION

Page 1 of 1

PATENT NO. : 10,644,340 B2
APPLICATION NO. : 15/088432
DATED : May 5, 2020
INVENTOR(S) : Bruno Ghyselen It is certified that error appears in the above-identified patent and that said Letters Patent is hereby corrected as shown below:

On the Title Page
In ITEM (73) Assignee: change "Soitec, Bermin (FR) to --"Soitec, Bernin (FR)--

In the Specification
Column 11, Line 39, change "of CIE might" to --of CTE might--

In the Claims
Claim 16, Column 14, Line 36, change "electrolyte layer, and" to --electrolyte layer; and--

Signed and Sealed this
Ninth Day of June, 2020

Andrei Iancu
*Director of the United States Patent and Trademark Office*